Nov. 10, 1953     A. D. REDNER     2,658,624
FILTER
Filed Aug. 7, 1948     2 Sheets-Sheet 1
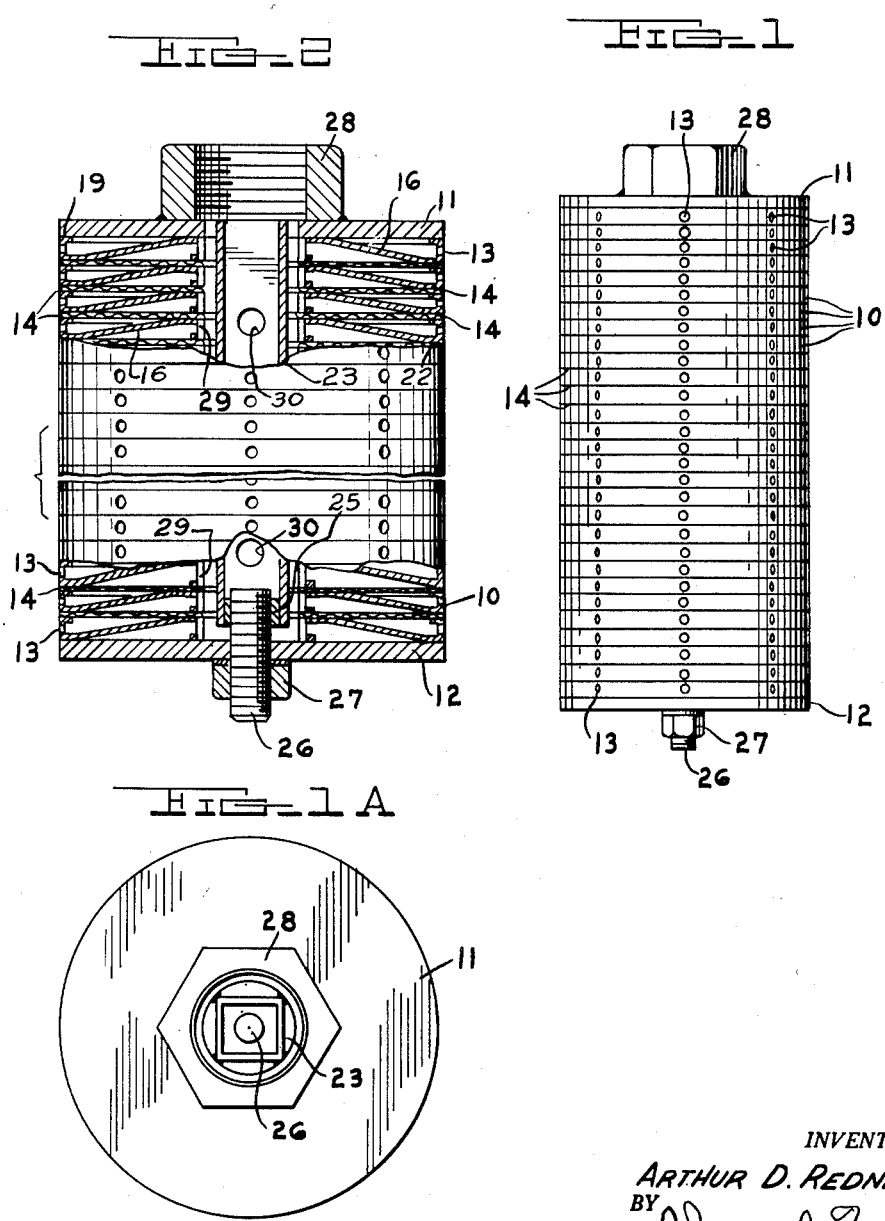
INVENTOR.
ARTHUR D. REDNER
BY Joseph Farley
ATTORNEYS

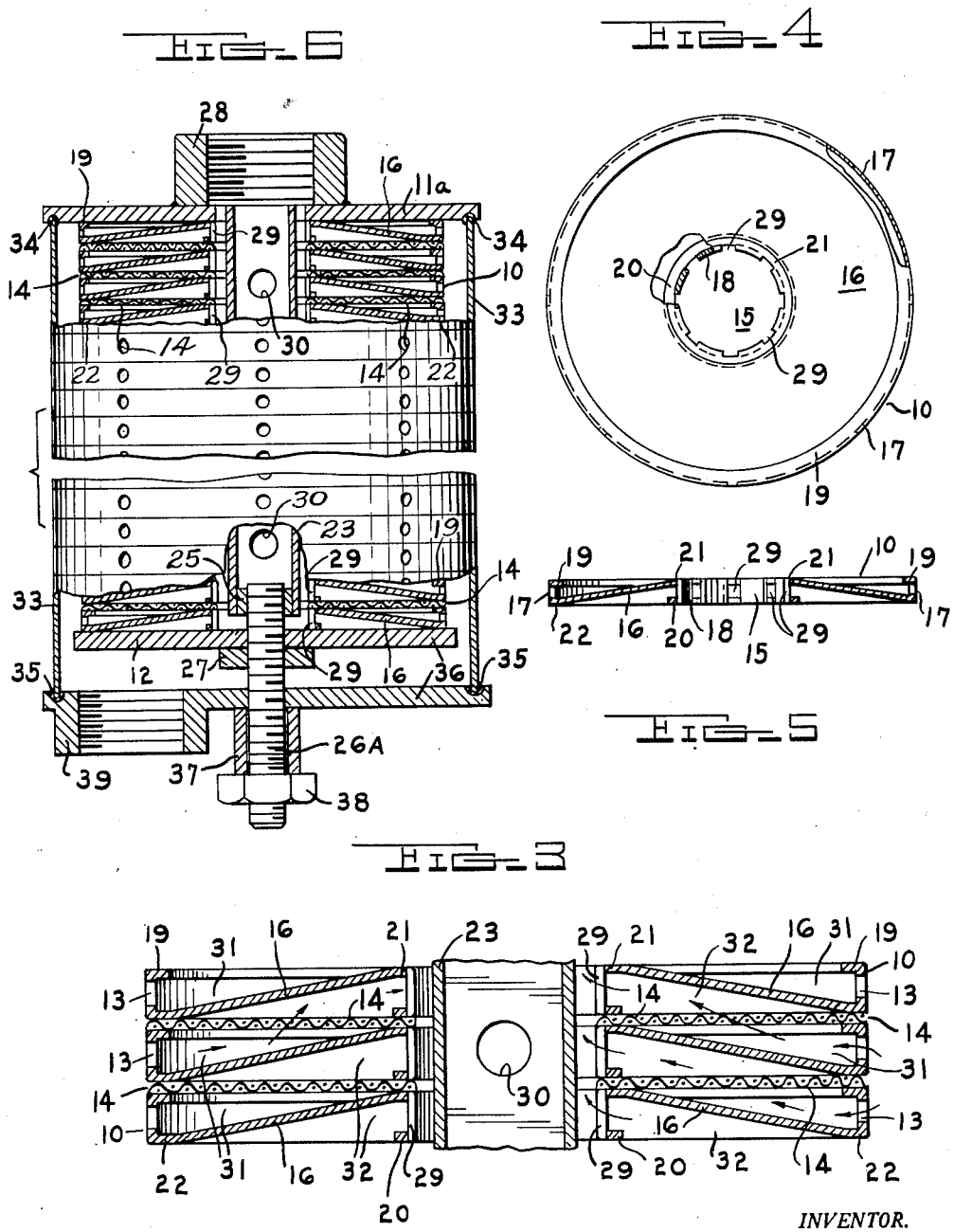

Patented Nov. 10, 1953

2,658,624

UNITED STATES PATENT OFFICE 2,658,624

FILTER

Arthur D. Redner, Farmington, Mich., assignor to General Filters, Inc., Detroit, Mich., a corporation of Michigan Application August 7, 1948, Serial No. 43,122

3 Claims. (Cl. 210—169)

1

This invention relates to a fluid filter adaptable to either gas or liquid filtering. It is the principal object of the present invention to provide a multicell filter made up of extremely simple component parts and adapted to provide an unusually large filtering area in comparison with the total space occupied by the filter.

More specifically, it is an object of the invention to provide a filter construction wherein a series of sheet metal separator elements may be stacked together with filtering elements interposed between adjacent surfaces of the separator elements and thereby held in spaced relation.

Another object is to provide a filter wherein a space is provided below each filtering element wherein filtered particles may settle so that a relatively large volume of filtered material may be accumulated before it becomes necessary to clean the filter.

A further object is to provide a filter of this general character wherein a large number of separator and filter elements may be held together in positive assembled relationship by merely tightening a single nut.

Another object is to provide a construction for a separator element which lends itself to be formed as a sheet metal stamping and which will serve the multiple purposes of holding layers of filter elements in spaced relationship, providing inlets and outlets for the fluid to be filtered, providing space for accumulating filtered particles, and providing a multitude of paths for the fluid to pass, each of which leads through at least one filter element.

A further object is to provide a filter of this type which utilizes an extremely simple form of filter element such as may be very economically produced and such as to permit replacement without requiring any part of the filter to be discarded other than the filter elements proper.

Another object is to provide a device for holding the separator and filter elements in assembled relationship which does not restrict the flow of fluid through the filter.

A further object is to provide a filter of this general character wherein varying sizes and capacity requirements may be met by filters employing identical parts with the exception of a single tube element which may be varied in length to meet such requirements.

Another object is to provide a construction wherein outlet ports in the separator elements may be formed in a plurality of such elements after they have been stamped with a single machining operation.

2

These and other objects will be apparent from the following description of a specific embodiment of my invention and from an examination of the drawings forming a part hereof, wherein:

Fig. 1 is a side elevation of the filter assembly;

Fig. 1A is a plan view of the filter assembly;

Fig. 2 is a sectional elevation of the assembly shown in Fig. 1;

Fig. 3 is an enlarged fragmentary sectional elevation showing the path of flow through the filter;

Fig. 4 is a plan view of a single separator element;

Fig. 5 is a sectional elevation of the separator element shown in Fig. 4; and

Fig. 6 is a view like Fig. 2 showing a modified construction adapting the filter with an outer casing to provide inlet and outlet pipe connections.

Referring to Fig. 1, it will be seen that a stack of separator elements 10 are held together between two end plates 11, 12, and that a series of holes 13 in the perimeter of each of the separator elements form the inlet ports to filter elements 14 which may be fabric, wire screen, felt or other suitable filtering material interposed between adjacent surfaces of the separator elements 10.

Referring to Figs. 4 and 5, it will be seen that the separator elements are formed as annular sheet metal discs with a central cylindrical opening 15, and having a sloping wall 16 formed at the inner and outer edges with oppositely extending flanges 17, 18 terminating respectively in horizontally extending lips 19, 20. The lips 19 and 20 are formed to lie in the horizontal plane of the flange bases 21, 22. As shown best in Fig. 2, the flange lips 19 and 20 are adapted to bear against adjacent flange bases 22, 21, thereby providing a pair of inner and outer continuous ring-shaped gripping surfaces in the same horizontal plane between each pair of adjacent separator elements. Annular flat filter elements 14, also provided with a circular central opening, are interposed between and held by the gripping surfaces of such adjacent separator elements. A square tube 23 is welded to the end plate 11 and extends through the openings 15 in the separator and filter elements, the outermost edges of such tube having a diagonal dimension almost equal to the diameter of the cylindrical openings and serving to locate the separator and filter elements in proper lateral relationship. A square nut 25 is welded to the inner surface of the lower end of the tube 23 and a stud 26 extending through the lower end plate 12 is threaded into such nut.

In assembling the filter, the tube 23 and end plate 11 are held in inverted position and alternate separator elements and filter elements are dropped into position over the end of the tube. When a stack of proper height has been formed, the end plate 12 is placed over the stud 26 and the nut 27 tightened against such end plate, thereby placing the tube 23 under tension and each of the separator elements under compression firmly securing each of the filter elements between the adjacent gripping surfaces of the various separator elements. A nut 28 welded to the end plate 11 is provided with an internal pipe thread serving as the filter outlet.

As already mentioned, a series of inlet holes 13 are provided around the perimeter of each of the separator elements as formed by the flanges 17. In addition, a series of slots 29 are formed in the inner flange 18 which penetrate through such flange and form outlet ports for the individual filter elements. In assembling the separator elements on the square tube 23, the slots 29 are positioned so as to lie opposite the various flat sides of the square tube so that no obstruction to flow is presented by the corners of the tube. A series of holes 30 provide an unrestricted flow from the outside to the inside of the tube so that a total cross sectional area of flow equal to the area of the openings 15 in the separator elements less the cross sectional area of the tube 23 is open to the flow of filtered fluid. Thus, as best shown in Fig. 3, the flow of gas or liquid to be filtered is from the outside of the filter through the openings 13 into an enclosed chamber 31 on the under side of each of the filter elements 14 and thence through such filter elements to chambers 32 on the upper side of the filter elements and from such chambers through the slots 29 to the discharge pipe of the filter. It is preferable that the filter be located in a vertical position as shown in Fig. 2 with the flow directed upwardly through the filter elements so that gravity and the eddy currents between inlet openings 13 will cause filtered particles to settle down in the space between such openings. With this arrangement a substantial amount of filtered matter may be accumulated without substantially impairing the operating efficiency of the filter.

If the filter is to be submerged in a fluid reservoir or is to be openly exposed to a gaseous atmosphere to be filtered, no outside shell is required and the assembly shown in Fig. 2 comprises a complete filter assembly. In the event that the filter is to be interposed in a pipeline, a modification employing an inlet pipe opening and outer casing as shown in Fig. 6 may be employed. Herein outer casing 33 is formed as a simple cylindrical tube which is held endwise in sealing grooves 34 in end plate 11a and 35 in a supplemental end plate 36. A longer stud 26a is employed which passes through the outer end plate 36 as well as a spacer tube 37 and a nut 38 serves to place the casing 33 under compression in its sealing grooves. A nut 39 having an inlet pipe thread is welded on to the end plate 36 and permits the introduction of fluid to the various separator elements.

In forming the separator elements from flat sheet stock the following steps are employed: A flat disc of suitable diameter is first blanked out of sheet stock, the inlet holes 13 being punched in the same operation. These blanks are then formed in dies that provide a cup in the center having vertical walls which become the inner flanges 21, as well as a sloping wall 20 and a vertical flange 17. The cup thereby formed, and the outer flange are somewhat deeper than the thickness of the finished separator element, and in successive operations the center of the cup-shaped portion is punched out and the ends of the flanges rolled over to form the lips 19 and 20. It has been found in practice that holes of suitable size cannot be punched in the inner flange 21 in the initial blanking operation without incurring subsequent cracking during the operation in which the flange 18 is drawn.

As will be understood by anyone skilled in the art, the slots 29 may be readily cut in a number of preformed and stacked separator elements by a single broaching operation. Accordingly, the slotted construction provides an answer to a problem which would otherwise constitute an obstacle to the practical manufacture of separator elements of the form disclosed since it would be impracticable to drill or punch holes in the flange 21 after forming such flange.

It will be seen from the above description that a filter has been provided that includes a plurality of independent filters arranged in a single assembly to provide parallel flow through a series of filter elements. With this arrangement an extremely large filter area is made available within a relatively small volume occupied by the filter as a whole. Furthermore, single layer filter elements may be employed which will provide a positive control on the maximum particle that will pass through the filter. The filter may be readily cleaned by backwash or the individual filter elements may be readily removed and cleaned or replaced.

Thus, it will be seen that each of the objects recited above are met by the embodiment disclosed herein. However, it is to be understood that numerous modifications and changes in the details of the construction could be resorted to without departing from the scope of the invention as defined in the following claims.

I claim:

1. A filter separator element comprising an annular disc integrally formed from sheet metal of uniform gauge, said disc having an annular central opening and an annular perimeter, a flange at the center opening extending axially in one direction, a similar flange at the outer periphery extending in an opposite direction, the surface of the disc being inclined axially from the center to the outer periphery, the respective flanges terminating axially at a distance equal to the axial inclination of the disc surface, a plane ring surface formed at the base of each flange, a radially extending lip formed at the terminal end of each flange, each lip forming a plane ring surface in substantially the same plane as the ring surface at the base of the other flange and in axial alignment with the plane surface formed at the base of its own flange, the axial extremities of said disc providing thereby inner and outer axially aligned ring surfaces lying respectively in two planes extending perpendicular to the axis of said disc and forming the axial boundaries thereof, radial openings being provided in the respective flanges for fluid flow therethrough.

2. A filter comprising a plurality of axially stacked separator elements as set forth in claim 1, flat circular filter elements being interposed between adjacent separator elements and engaged by the respective inner and outer adjacent ring surfaces of said separator elements.

3. A filter separator element as set forth in claim 1 wherein the radial openings through the inner flange comprise axially extending slots of a uniform radial depth slightly exceeding the thickness of the flange wall and substantially less than the radial depth of said flange lip.

ARTHUR D. REDNER.

References Cited in the file of this patent

UNITED STATES PATENTS

| Number | Name | Date |
|---|---|---|
| 335,040 | Piefke | Jan. 26, 1866 |
| 893,360 | Paul | July 14, 1908 |
| 1,295,006 | Corey | Feb. 18, 1919 |
| 1,539,116 | Heyn | May 26, 1925 |
| 1,624,689 | Sweetland | Apr. 12, 1927 |
| 1,677,892 | Herbert et al. | July 24, 1928 |
| 2,278,453 | Kracklauer | Apr. 7, 1942 |
| 2,495,095 | Ewbank | Jan. 17, 1950 |

FOREIGN PATENTS

| Number | Country | Date |
|---|---|---|
| 126,447 | Great Britain | May 6, 1919 |
| 412,100 | Great Britain | June 21, 1934 |
| 686,434 | Germany | Jan. 9, 1940 |